Dec. 8, 1953 — M. H. GRAHAM — 2,661,864
PRESSURE COOKER RELIEF DEVICE
Filed Jan. 23, 1948 — 2 Sheets-Sheet 1
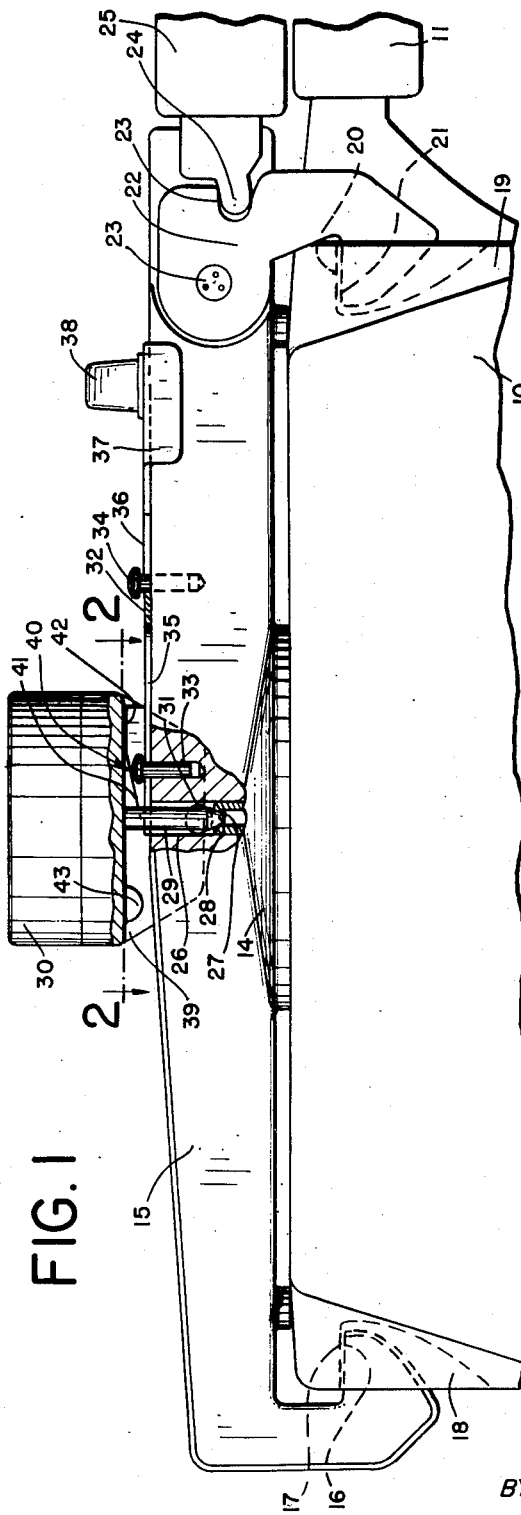
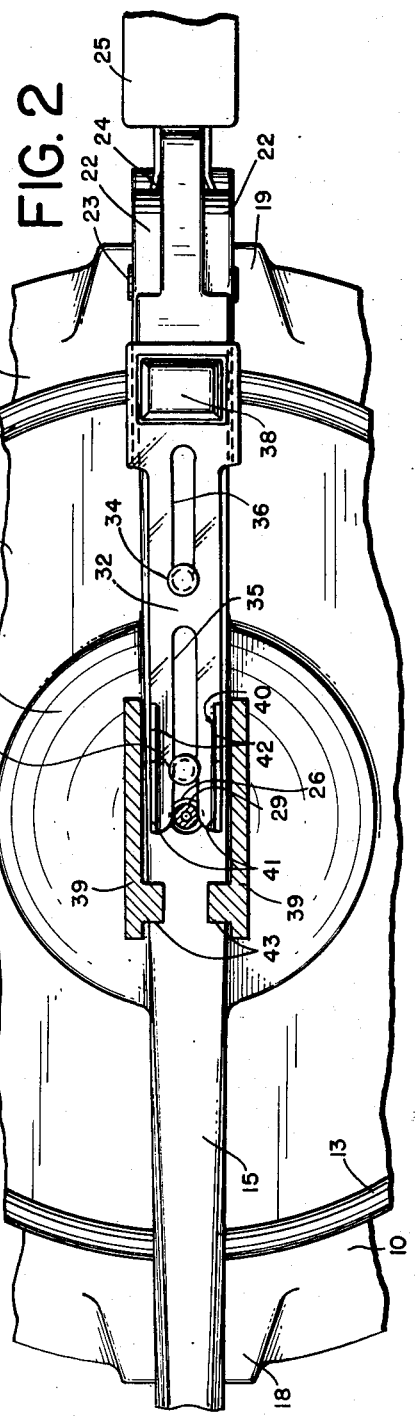
INVENTOR
MAURICE H. GRAHAM
BY William C. Babcock
ATTORNEY Dec. 8, 1953  M. H. GRAHAM  2,661,864
PRESSURE COOKER RELIEF DEVICE
Filed Jan. 23, 1948  2 Sheets-Sheet 2
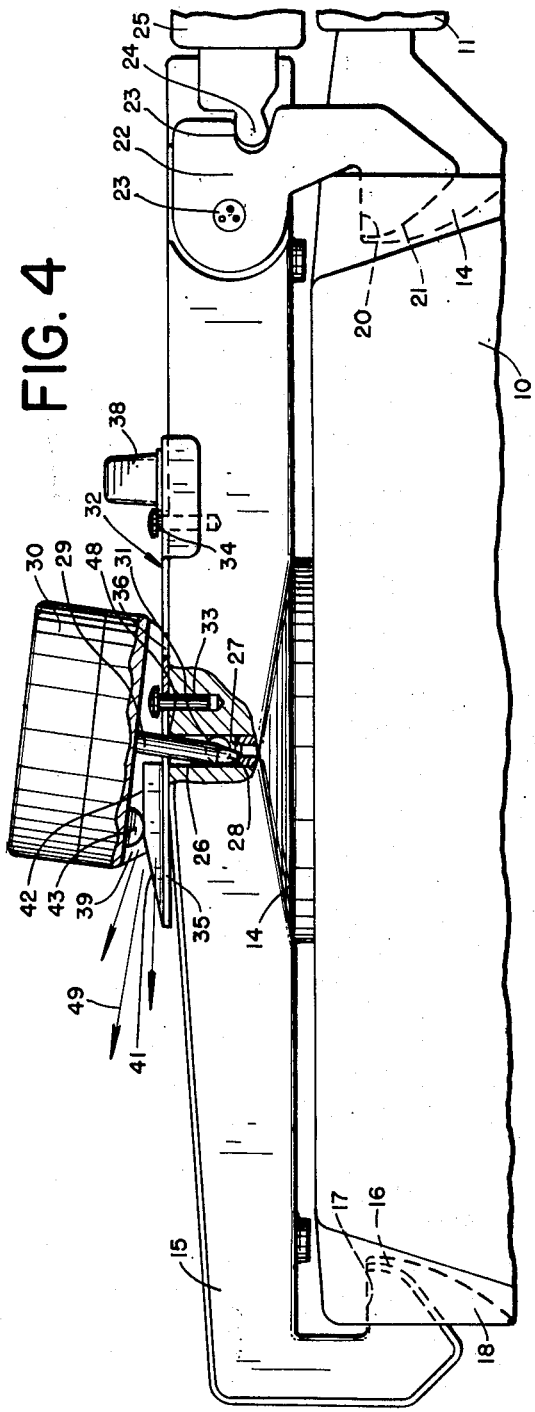
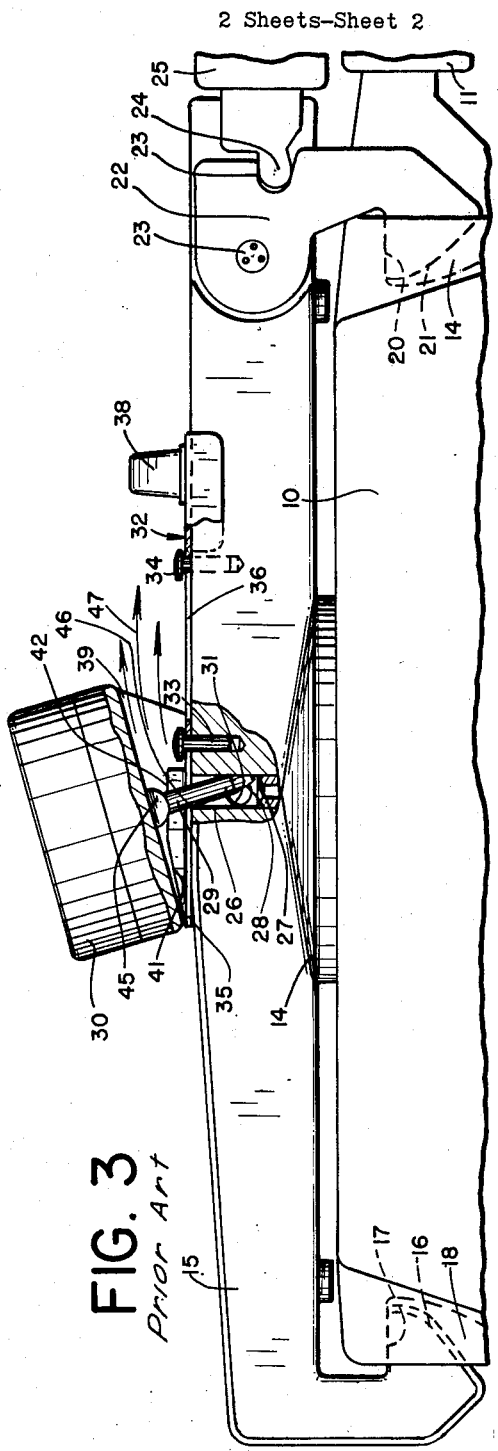
INVENTOR
MAURICE H. GRAHAM
BY William C. Babcock
ATTORNEY Patented Dec. 8, 1953

2,661,864

UNITED STATES PATENT OFFICE 2,661,864

PRESSURE COOKER RELIEF DEVICE

Maurice H. Graham, Minneapolis, Minn., assignor to General Mills, Inc., a corporation of Delaware Application January 23, 1948, Serial No. 3,927

8 Claims. (Cl. 220—44)

This application relates to an improved pressure relief and control device for pressure cookers and the like, and more particularly to such a device in which the direction of escape of steam is controlled.

The use of a weighted control member to close a pressure relief opening in a pressure cooker or similar pressure vessel is well known in the art. In previous devices of this nature, however, no provision has been made for controlling in certain cases the direction in which the steam pressure is released, with the result that the escaping steam is often directed toward the hands of the operator or the handle of the device.

With these defects of the prior art in view it is accordingly one object of the invention to provide an improved pressure relief and control device for a pressure vessel.

It is a further object to provide a pressure vessel with a control weight and means for lifting said weight to relieve the internal pressure, and in which the lifting means is so arranged that the direction of escape of steam or similar vapor is positively controlled.

It is still another object to provide a pressure control member for a cooker, in which the control member has a lifting portion which is laterally offset from the center of gravity of said member.

Other objects and advantages of the present invention will be apparent from the following specification wherein a preferred embodiment of the device will be described.

In the drawings, wherein like references indicate like parts,

Figure 1 is a partial side elevation of a pressure cooker embodying one form of the present invention, certain sections being broken away for the sake of clearness;

Fig. 2 is a partial top plan of the device of Fig. 1, with the pressure control device being shown in section on the line 2—2 of Fig. 1;

Fig. 3 is a view similar to Fig. 1 of a prior art device in which provision has not been made for controlling the direction in which the pressure is relieved; and Fig. 4 is a view similar to Fig. 1 with the pressure weight according to the present invention raised to its open or relief position for controlled escape of vapor.

As shown in Fig. 1 the present invention has been embodied in a pressure cooker having a body portion 10 provided with a handle 11. A suitable cover 12 (Fig. 2) and sealing gasket 13 are mounted on the enlarged portion 14 of a suitable crossbar or bridge 15 which is removably attached to the cooker body 10.

Any desired method of attachment of the cover to the cooker body may be employed and it will be understood that the features of the pressure relief mechanism according to this invention are not necessarily limited to the specific type of cover and bridge mechanism shown in the drawings.

As one method of fastening the bridge 15 to the cooker body a hook 16 has been provided at one end of said bridge. This hook may be engaged within a suitable notch or recess 17 in the thickened portion 18 of the cooker body 10. At the opposite side of the cooker body a similar thickened portion 19 adjacent to handle 11 is provided with a recessed locking surface 20 which is engaged by the hook 21 of a latch or retaining member 22, pivoted at 23, to the corresponding end of crossbar 15.

The structure shown is similar to that described and claimed in the co-pending application of Clifford C. Schweiso, Serial No. 24,764, filed May 3, 1948, now U. S. Patent 2,599,072.

As shown in the drawings and described in said application, the latch 22 is actuated by means of a projection 24 which engages a notch 23 in the latch 22. Projection 24 in turn is carried by a suitable operating member or handle 25 so that movement of handle 25 will result in rotation of the latch about pivot 23. Since the particular means by which the latch is rotated forms no part of the present invention, it will not be further described, it being understood that any other suitable mechanism for rotation of the latch may be employed.

At an intermediate point on the crossbar 15 a vertical passage 26 has been provided, said passage being connected with the interior of the cooker so that the pressure at any given time within the passage will correspond exactly to the pressure at that time in the cooker body. At an intermediate portion of said passage 26 there is a valve seat 27 formed by a narrowed portion of the passage or by a separate bushing, as desired. To close this valve seat or opening 27, a conical valve 28 is provided, said valve portion 28 being at the lower end of the vertical stem 29 of a pressure control weight 30. It will be apparent from the drawing that stem 29 extends vertically downward from the center of the control weight 30 and it is essential, as is well known in the art, that said stem be vertically aligned with the center of gravity of the weight. Such alignment is required, in order that the weight may remain in proper position with valve portion 28 seating accurately against valve opening 27.

It is desirable that stem 29 fit closely within passage 26 to add to the stability of the valve. However, stem portion 29 is of necessity slightly smaller in diameter than the upper section of passage 26 in order that the stem may slide freely within said passage as the valve 28 adjusts itself to seat 27. Thus, there will be a small space between the stem and passage walls, which will permit a certain amount of relative movement between the parts.

For the escape of steam or vapor which is ultimately released when valve portion 28 is lifted from the seat, lateral openings 31 have been provided in each side of bridge 15, said openings communicating with passage 26 just above the valve seat.

The operation of the control weight 30 and valve 28 will be readily understood. The weight of member 30 is so chosen with reference to the area of valve opening 27 that a predetermined excessive pressure within the cooker body 10 will act against the valve 28 and stem 29 to lift the weight 30 against the action of gravity. As soon as the weight is lifted, the steam or other vapor may escape through the lateral openings 31. Since, however, stem 29 does not fit within passage 26 in a fully sealed or air-tight manner, some portion of the steam or vapor may escape vertically upward along the outside of said stem.

It is desirable in a control member of this nature to have some means for relief of pressure at the will of the operator, even when the pressure is insufficient to raise the weight and relieve itself. For this purpose an operating member 32 has been movably mounted on bridge 15 for movement between two positions. In the device shown in the drawing the mounting means for operating member 32 consists of two pins 33 and 34 which pass through corresponding slots 35 and 36 in the operating member. Thus member 32 is in the form of a slide which can be reciprocated longitudinally of bridge 15 between two extreme positions which are limited by the length of slot 36. At one end of the slide 32 downwardly extending flanges 37 are provided at each side to engage the sides of bridge 15 and serve as a further guide for the slide. A handle or knob 38 of plastic or other desired material is fastened at one end of the slide. This knob is preferably arranged on the side of the weight toward handles 11 and 25, for convenience of the operator.

As indicated in Fig. 2, slot 35 is open at the end of slide 32 opposite handle 38. This open slot 35 not only engages pin 33 for guiding the slide but also receives stem 29 and permits vertical movement of the stem within said slot. In other words, there are two parallel end portions of slide 32 forming a fork projecting along the bridge, one of said ends being located at each side of stem 29 of control weight 30.

In order to lift the control weight in response to movement of the slide, interengaging means have been provided on both the slide and the pressure weight. While such interengaging means may assume any desired form which will accomplish the necessary lifting of the weight, the arrangement shown in the drawings includes two cam portions 40, one on each of the extended ends of slide 32. Each of these cam portions 40 further consists of a gently sloping portion 41 and a horizontal top surface 42. Cam portions 40 are adapted to engage with cooperating curved projections 43 on the pressure weight. As shown in the drawings these projections 43 are laterally offset with respect to the center of gravity of the weight in order to control the direction in which certain portions of the steam or vapor are released.

As shown particularly in Figs. 1 and 2, there is a downwardly projecting flange 39 on each side of the bottom of weight member 30. These flanges are parallel to the vertical sides of bridge 15 and are relatively close to said sides. The presence of these side flanges prevents any substantial turning of the weight around the axis of stem 29 and thus keeps the weight 30 and lifting projections 43 properly oriented with respect to bridge 15 and slide 32. A pressure control member having such depending flanges described and claimed in the copending application of Clifford C. Schweiso, Serial No. 24,763, filed May 3, 1948, now U. S. Patent 2,629,086.

Before the operation of the device of Figs. 1 and 2 is explained, it will be helpful to consider the operation of the prior art device shown in Fig. 3. The construction of the cooker, the cover, bridge, latch and operating member or slide in Fig. 3 is identical with the construction of the similar members shown in Figs. 1 and 2 and need not be discussed further. The construction of pressure weight 30 and stem 29 is likewise identical with the exception that the projections intended to cooperate with cam portions 40 of the slide are symmetrically positioned one on each side of stem 29, so that their effective center of lift is in alignment with the center of gravity of the weight. These portions are shown at 45 in Fig. 3.

In order to understand the defects of the prior art and the improvements according to the present invention, the difference in diameter of the stem portion 29 and passage 26 has been exaggerated considerably in the figure. When slide 32 in the device of Fig. 3 is in its extreme righthand position, which would correspond to the position of the slide in Fig. 1, the pressure weight 30 would function to relieve excessive pressure in exactly the same manner as the control weight in Fig. 1. However, when the slide 32 is moved to the left, to the position shown in Fig. 3, the sloping cam portion 41 will engage the projections 45 and will exert a force on said projections which is made up of two components, namely, a vertical or lifting component and a horizontal or sliding component. The latter component, of course, will be in the same direction as the slide is moved, i. e., to the left, and will tend to tilt the weight 30 slightly to the left as shown in Fig. 3. This tilting takes place simultaneously with the lifting of the weight and the lifting action, of course, opens the valve seat 27 and permits relief of pressure through the lateral openings 31. As pointed out above, however, a certain portion of the steam or vapor will escape upwardly through the space between the stem 29 and the walls of passage 26. Such escape of steam is undesirable and if uncontrolled, as in the device of Fig. 3, the escaping steam may be directed toward the knob or handle 38 where it may burn or annoy the operator. The vapor will be directed in this manner whenever weight 30 tilts in the direction shown in the figure so that the stem 29 engages the upper edge of passage 26 at point 46 on the side opposite knob 38. In other words, the stem bears directly against the edge of the passage at point 46 and effectively seals that side of the passage so that the escaping steam passes between the stem and the other side of the passage following the path indicated by arrows 47. With lifting portion 45 of the weight 30 centered, as shown in the figure, it will be clear that even after the weight has been fully raised so that portion 45 is resting on the flat upper surfaces 42 of cam 40, the weight 30 and stem 29 may accidentally tilt in the direction shown. Thus there is no positive and definite control of the direction in which the portion of steam leaking around the stem will escape.

These defects of the prior art construction are avoided by the structure shown in Figs. 1 and 2 and the manner in which said structure functions is shown in Fig. 4 in which, again, the difference in diameters of stem 29 and passage 26 has been exaggerated to facilitate the explanation. As shown in Fig. 4, the control member or slide 32 has been moved all the way to the left to its pressure relieving position. In the course of such movement the cams 40 have engaged the offset lifting projections 43 and again have exerted a force on said projections made up of both a vertical lifting component and a horizontal tilting component.

In this case, however, since projections 43 are offset from the center of gravity, the horizontal or tilting part of the force which is exerted as the slide 32 moves to the left and which might normally tend to tilt the weight 30 in the direction shown in Fig. 3, is more than offset by the opposite tilting action which is due to the fact that the lifting force aganst the weight is applied at a point offset from the center of gravity. Thus, as shown in Fig. 4, the weight 30 will not only be lifted but will be tilted positively toward knob 38. The weight will assume this tilted position, both in response to the engagement of the sloping cam portions 41 against lifting portions 43 and also in response to engagement of the flat portions 42 of the cams with said lifting portions. In other words, lifting portions 43 are so offset with respect to the center of gravity of the weight 30 that whenever the weight is partially or fully lifted in response to movement of the slide, the weight will be tilted toward knob 38.

The effect of such tilting is to force the stem 29 firmly against the upper side of passageway 26 at point 48 which is on the same side of the stem as knob 38. Thus, there will be no space at that side of the passage to permit escape of steam or vapor toward the knob or toward the handles 11 and 25 of the cooker itself. Instead, the steam or vapor which fails to escape through lateral openings 31 and which is forced accidentally up through the passage 26 will be released from said passage on the opposite side of stem 29 from the handles and will follow the path indicated by arrows 49 to escape in a direction away from the operator. The advantages in terms of safety and convenience of this controlled escape of pressure will be obvious.

While the present invention has been embodied in a specific structure, as shown in the drawings, it will be clear that many modifications and changes in the structure of the pressure cooker and its components and in the structure of the pressure control weight and its operating member will readily occur to persons skilled in this art. It is therefore intended that all such obviously equivalent forms of construction shall be considered within the scope of the attached claims.

Now, therefore, I claim:

1. In a pressure cooker having a body, a cover, a removable crossbar supporting said cover and having an open topped vertical passage therein provided with an intermediate valve seat, and a pressure control weight having a valve stem loosely receivable in said passage to close said seat and be supported thereby, the improvement comprising an operating slide movable longitudinally on said crossbar, a handle on said slide, a cam on said slide, and a portion on said weight engaged by said cam for lifting the weight as the handle is moved toward the weight, said portion being offset from said stem on the side opposite said handle for tilting said weight and stem toward the handle as the weight is lifted.

2. In a pressure cooker having a body, a body handle, a cover, a removable cover-supporting crossbar parallel to said handle and having an open topped vertical passage therein provided with an inner valve seat, and a pressure control weight having a valve stem loosely receivable in said passage to close said seat and be supported thereby, the improvement comprising an operating slide movable longitudinally on said crossbar, a knob on said slide on the side of said weight toward said body handle, a cam on said slide, and a portion on said weight engaged by said cam to lift the weight as the knob is moved toward the weight, said portion being offset from said stem on the side away from said knob for tilting said weight toward the handle and knob as the weight is lifted.

3. A pressure relief valve comprising a body member having an upper surface with an opening therein and a vertical passage extending downwardly from the opening, a valve seat in the passage at a point spaced substantially below the opening, a pressure control weight having a depending valve stem projecting downwardly through the opening and passage, a valve portion on said stem engaging the valve seat and thereby supporting the weight and closing the passage, the valve stem having an external cross section smaller than the internal cross section of the passage and thereby providing free vertical movement of the stem and weight in response to predetermined excess pressure at the valve seat as well as limited angular tilting of the stem away from the vertical axis of the passage; an operating member for the control weight movable between open and closed positions, a handle on the operating member, interengaging means on the operating member and control weight positively lifting the control weight and stem upwardly away from the seat in response to movement of the operating member to open position, and means requiring positive tilting of the upper portion of the stem against the edge of said opening nearest the handle in response to movement of the operating member to open position, thereby preventing escape of pressure fluid from the opening toward the handle.

4. A pressure relief valve according to claim 3 in which the operating member comprises a slide movable substantially horizontally along a path intersecting the axis of the passage and said interengaging means includes cooperating cam surfaces on the pressure weight and slide.

5. A pressure cooker comprising a member having an upper surface with an opening therein and a vertical passage extending downwardly from the opening, a valve seat in the passage at a point spaced substantially below the opening, a pressure control weight having a depending valve stem projecting downwardly through the opening and passage and engaging the valve seat thereby supporting the weight and closing the passage, the valve stem having an external cross section substantially smaller than the internal diameter of the passage and thereby providing free vertical movement of the stem and weight in response to predetermined excess pressure at the valve seat, as well as limited angular tilting of the stem away from the axis of the passage, a carrying handle on the cooker laterally offset from the opening, an operating member for the control weight comprising a slide movable substantially horizontally along a path intersecting the carrying handle and the axis of said passage and having a manually operable knob between said opening and handle, said knob and operating member being movable between open and closed positions, with the knob moving toward the weight during operation from closed to open position, and interengaging means on the operating member and control weight positively lifting the control weight and stem upwardly away from the seat and positively tilting the stem against the edge of said opening nearest the handle in response to movement of the operating member to open position, thereby preventing escape of pressure fluid from the opening toward the handle, said interengaging means including cooperating cam surfaces on the pressure weight and slide with the cam surface on the weight located on the opposite side of the center of gravity of the weight from said handle.

6. A pressure relief valve comprising a body member having an upper surface with an opening therein and a vertical passage extending downwardly from the opening, a valve seat in the passage at a point spaced substantially below the opening, a pressure control weight having a depending valve stem projecting downwardly through the opening and passage, a valve portion on said stem engaging the valve seat and thereby supporting the weight and closing the passage, the valve stem having an external cross section smaller than the internal cross section of the passage and thereby providing free vertical movement of the stem and weight in response to predetermined excess pressure at the valve seat as well as limited angular tilting of the stem away from the vertical axis of the passage; an operating member for the control weight movable between open and closed positions, a handle on the operating member, and interengaging means on the operating member and control weight positively lifting the control weight and stem upwardly away from the seat and positively tilting the stem against the edge of said opening nearest the handle in response to movement of the operating member to open position, thereby preventing escape of pressure fluid from the opening toward the handle, said interengaging means including a lifting portion on the control weight located on the opposite side of the center of gravity of the weight from said handle.

7. A pressure relief valve comprising a body member having an upper surface with an opening therein and a vertical passage extending downwardly from the opening, a valve seat in the passage at a point spaced substantially below the opening, a pressure control weight having a depending valve stem projecting downwardly through the opening and passage, a valve portion on said stem engaging the valve seat and thereby supporting the weight and closing the passage, the valve stem having an external cross section smaller than the internal cross section of the passage and thereby providing free vertical movement of the stem and weight in response to predetermined excess pressure at the valve seat as well as limited angular tilting of the stem away from the vertical axis of the passage; an operating member for the control weight comprising a slide movable substantially horizontally along a path intersecting the axis of the passage, a handle on the slide, said handle and slide being movable between open and closed positions, with the handle moving toward the weight during operation from closed to open position, and interengaging means on the operating member and control weight positively lifting the control weight and stem upwardly away from the seat and positively tilting the stem against the edge of said opening nearest the handle in response to movement of the operating member to open position, thereby preventing escape of pressure fluid from the opening toward the handle, said interengaging means including cooperating cam surfaces on the pressure weight and slide with the cam surface on the pressure weight located on the opposite side of the center of gravity of the weight from said operating slide handle.

8. A pressure relief valve comprising a body member having an upper surface with an opening therein and a vertical passage extending downwardly from the opening, a valve seat in the passage at a point spaced substantially below the opening, a pressure control weight having a depending valve stem projecting downwardly through the opening and passage, a valve portion on said stem engaging the valve seat and thereby supporting the weight and closing the passage, the valve stem having an external cross section smaller than the internal cross section of the passage and thereby providing free vertical movement of the stem and weight in response to predetermined excess pressure at the valve seat as well as limited angular tilting of the stem away from the vertical axis of the passage; an operating member for the control weight movable between open and closed positions, and interengaging means on the operating member and control weight positively lifting the control weight and stem upwardly away from the seat and positively tilting the stem against a definitely predetermined side of said opening and thereby preventing escape of pressure fluid at that side of the opening, said interengaging means including a lifting portion on the control weight located on the opposite side of the center of gravity of the weight from said predetermined side of the opening.

MAURICE H. GRAHAM.

References Cited in the file of this patent

UNITED STATES PATENTS

| Number | Name | Date |
|---|---|---|
| 230,963 | Robertson | Aug. 10, 1880 |
| 1,106,837 | Pfaehler | Aug. 11, 1914 |
| 1,844,071 | Newell | Feb. 9, 1932 |
| 1,933,740 | Kuwada | Nov. 7, 1933 |
| 2,200,903 | Stephens | May 14, 1940 |
| 2,245,946 | Vermere | June 17, 1941 |
| 2,565,964 | Graham | Aug. 28, 1951 |
| 2,566,008 | Westby | Aug. 28, 1951 |

FOREIGN PATENTS

| Number | Country | Date |
|---|---|---|
| 44,906 | Austria | July 1, 1910 |